United States Patent Office 3,222,377
Patented Dec. 7, 1965

3,222,377
HALOGENATION OF PHTHALOCYANINES
Richard M. Ferrill, Jr., Glens Falls, N.Y., assignor to Hercules Powder Company, Wilmington, Del., a corporation of Delaware
No Drawing. Filed Feb. 12, 1963, Ser. No. 257,852
3 Claims. (Cl. 260—314.5)

This invention relates to the halogenation of phthalocyanines and to novel reaction mediums of this purpose.

It is well known that it is difficult to substitute all or nearly all of the sixteen aromatic hydrogen atoms in, for example, copper phthalocyanine by using the direct action of a free halogen without any other material present as a liquid medium for the reaction. Consequently, the most feasible processes have involved the use of a suitable material which is a liquid at the halogenation temperature and which might, in some cases, itself be a halogenating agent, but which, more importantly, acts as a reaction medium for the halogenation.

Various types of materials including hydrocarbons and derivatives of hydrocarbons, especially halogen derivatives, inorganic compounds containing halogen, organic acids or anhydrides, e.g., phthalic anhydride, organic sulfonic acids, and various combinations of these, all of which are liquids at the reaction temperature, have been suggested as liquid media for this halogenation. However, each of these is subject to one or more disadvantages. Thus, some are very corrosive as well as hazardous to handle, others are very difficult to remove from the product and recover for re-use, still others give very poor yields and/or incomplete halogenation, and some require the use of high temperatures and/or pressures.

A principal object of the present invention is the provision of an improved and more economical method of halogenating phthalocyanines.

A further object of the invention is the provision of a method for halogenating phthalocyanines which gives a very high yield of a product which is highly halogenated and of good quality.

A still further object of the invention is the provision of a method for halogenating phthalocyanines utilizing a medium for the halogenation which is easily separable from the product and which can be easily and economically recovered in a form suitable for re-use in the halogenation.

Another and more specific object of the invention is the provision of an improved method of halogenating copper phthalocyanine using phthalic anhydride or a halogenation derivative of phthalic anhydride as the reaction medium.

Still another object of the invention is the provision of an effective catalyst system which can be regenerated easily with only moderate losses of catalyst.

It has now been found that the above objects can be attained by carrying out the halogenation of the phthalocyanine compound in a medium comprised of phthalic anhydride or halogenation derivatives of phthalic anhydride and a molybdenum-containing catalyst. This medium is readily removed from the final product by drowning in water, in which the medium hydrolyzes and dissolves, and then filtering off the product. The medium can then be very easily and economically recovered from the filtrate for re-use in further halogenations by evaporating the water.

Having described the invention generally, the following examples are given to illustrate specific embodiments thereof:

*Example 1*

| | Parts |
|---|---|
| Phthalic anhydride | 1850 |
| Molybdenum pentachloride | 100 |

Chlorine was passed through a melt of the above materials at 162° C. at the rate of 2.80 parts of chlorine per minute for a total of 672 minutes while stirring vigorously. The chlorinated phthalic anhydride obtained was analyzed and found to contain 30.5% chlorine and 1.31% molybdenum.

To a glass reactor were charged:

| | Parts |
|---|---|
| Chlorinated phthalic anhydride (as obtained above) | 480 |
| Acid-leached crude copper phthalocyanine | 40 |

The reactor was protected from moisture in the atmosphere with a drying tube. While stirring vigorously at 162° C., chlorine was passed through at 0.94 part per minute for 228 minutes. The mixture was then drowned in water and filtered to remove the product which was washed and dried.

The product amounted to 76 parts which equals 1.90 parts per part of copper phthalocyanine used. This product, when acid-pasted and compared to a commercial polychlorinated copper phthalocyanine green by rubbing up on the Hoover muller, was slightly deep in masstone, a trace strong, and a trace bright in tint, and close in drawout. It analyzed 49.1% chlorine, whereas the type of commercial product to which it was compared analyzed from 47.7% to 48.3% chlorine by the same method. On the basis of the chlorine analysis, the yield was 99% of the theoretical.

When the chlorination time was reduced to 138 minutes, the yield of product was 76.35 parts which equals 1.91 parts per part of copper phthalocyanine used, and was, when acid-pasted and compared to the commercial product in test on the Hoover muller, a little deep in masstone, slightly blue and slightly bright in tint, and slightly blue in drawout. It analyzed 48.8% chlorine. On this basis, the yield was 100% of the theoretical.

When the chlorination time was increased to 308 minutes, the yield of product was 75.4 parts which equals 1.89 parts per part of copper phthalocyanine used. When acid-pasted and compared to a commercial product in tests on the Hoover muller, it was slightly deep in masstone, slightly bright in tint, and close in drawout.

*Example 2*

| | Parts |
|---|---|
| Commercial phthalic anhydride | 308.0 |
| Molybdenum trioxide, pure grade | 8.8 |
| Ground sulfur | 11.7 |

The phthalic anhydride was first melted in a glass chlorination vessel and then the molybdenum trioxide and sulfur were added. While this mixture was stirred vigorously at 162° C., chlorine was passed through it at the rate of 0.94 part per minute for a total of 413 minutes. At that point the charge weighed 468½ parts. A sample amounting to 5½ parts was removed and analyzed and found to contain 32.0% chlorine and 1.20% molybdenum.

After the above chlorination was finished, there was added 40.0 parts of acid-leached crude copper phthalocyanine. While stirring the mixture at 162° C., chlorine was passed through at the rate of 0.94 part per minute for 228 minutes. The mixture was then drowned carefully with agitation in 480 parts of hot water, filtered, and the filter cake washed with three small portions of hot water. The yield of color was 75.3 parts which equals 1.88 parts per part of copper phthalocyanine used. When acid-pasted and compared to a commercial polychlorinated copper phthalocyanine green by rubbing up on the Hoover muller, it was slightly deep in masstone, slightly strong, slightly bright, and a trace blue in tint, and a trace strong in drawout.

Example 3

The filtrate from Example 2 was evaporated by heating until the temperature had risen to 162° C. and no more water distilled out. Then while stirring at 162° C., air was blown through to remove a small additional amount of water. A sample was analyzed and found to contain 30.7% chlorine and 1.06% molybdenum. After sampling and transferring to the chlorinator, there was present 441 parts of chlorinated phthalic anhydride.

There were then added:

| | Parts |
|---|---|
| Molybdenum trioxide, pure grade | 2.0 |
| Powdered sulfur | 11.7 |

Chlorine was then passed in as in Example 2 at the rate of 0.94 part per minute while stirring at 162° C. until no more red-brown liquid distilled. The charge then weighed 459 parts. Then was added: Commercial phthalic anhydride, 14 parts.

Chlorine was passed in as above until the total weight of the charge had increased to 479½ parts, requiring 33 minutes. Then was added: Acid-leached crude copper phthalocyanine, 40 parts.

From this point on, the chlorination was carried out according to the same method as used in Example 2. The yield of color was 75.9 parts which equals 1.90 parts per part of copper phthalocyanine used. When acid-pasted and compared to a commercial polychlorinated copper phthalocyanine green by rubbing up on the Hoover muller, it was slightly deep in masstone, a trace strong, slightly bright, and a trace blue in tint, and a trace strong and a trace blue in drawout.

Example 4

Using the aqueous filtrate from Example 3, the procedure of Example 3 was repeated. After reconcentrating, etc., the dichlorophthalic anhydride amounted to 456½ parts, which analyzed 32.6% chlorine and 0.96% molybdenum. To this were added:

| | Parts |
|---|---|
| Molybdenum trioxide, pure grade | 2.34 |
| Powdered sulfur | 11.7 |

After passing chlorine gas through the required length of time, the weight was 473 parts, and no phthalic anhydride was added. Another chlorination was completed yielding 1.89 parts of green of good quality per part copper phthalocyanine.

Example 5

A series of eight chlorinations was carried out re-using each time the same batch of chlorinated phthalic anhydride as the reaction medium over and over again. The initial procedure made use of 480 parts of dichlorophthalic anhydride, containing 1.07% molybdenum having originated from molybdenum pentachloride. In each case, 40.0 parts of copper phthalocyanine was chlorinated at 162° C. to produce a color close in shade to a commercial polychlorinated copper phthalocyanine green, and in a good yield.

In each case, the final chlorination mixture was drowned in 480 parts of water, refluxed a short time, and filtered. The filtrate was reconcentrated until the temperature reached 162° C., air was passed through briefly, and a small amount of sulfur or sulfur monochloride added, followed by some chlorine. Then the catalyst concentration was brought up to the desired level by adding molybdenum pentachloride. A molybdenum concentration of 1.00% was used in the second chlorination and 1.25% thereafter.

After the fourth chlorination, the recovered anhydride was not completely liquid at 162° C. It was redissolved in an equal weight of water, stirred at room temperature, and filtered. After the first few chlorinations, the anhydride had been completely soluble under these conditions, but in this case, on filtering the aqueous solution at room temperature, a filter residue of 169 parts was obtained. Some change had occurred to make part of the anhydride higher melting and less soluble. The crystallized material after dehydrating at 340° C. was found to have a melting point of 176–206° C. and analyzed 33.4% chlorine.

After the sixth and seventh chlorinations, removal of high melting material by filtration of the aqueous solution was again found necessary. Overall in the eight chlorinations, replacement of an average of 13% of the anhydride medium per trial was found necessary. Allowing for known sampling losses, the solvent recovery averaged 91%.

Example 6

| | Parts |
|---|---|
| Commercial phthalic anhydride | 315 |
| Molybdenum trioxide, pure grade | 18 |
| Powdered sulfur | 12 |

The above materials were charged to a glass chlorinator and, while stirring at 142° C., chlorine was passed through at the rate of 0.94 part per minute until the charge weighed 503 parts, requiring 484 minutes. It then contained approximately 2.5% molybdenum. Then was added: Acid-leached crude copper phthalocyanine, 40 parts.

Chlorination was then continued 228 minutes at the same rate while stirring at 122° C. The product was worked up by drowning in water and filtering and amounted to 76 parts equal to 1.90 parts of green per part of copper phthalocyanine used. When acid-pasted and compared to a commercial polychlorinated copper phthalocyanine green by rubbing up on the Hoover muller, it was slightly deep in masstone, a trace blue and a trace clean in tint, and a trace blue in drawout. It analyzed 48.8% chlorine.

Example 7

| | Parts |
|---|---|
| Commercial phthalic anhydride | 315.0 |
| Molybdenum trioxide | 4.5 |
| Powdered sulfur | 12.0 |

The above materials were charged to a glass chlorinator and chlorine was passed through for 455 minutes at the rate of 0.94 part per minute while stirring at 162° C. until the charge weighed 475 parts. A sample amounting to 3 parts was then removed. Then was added: Acid-leached crude copper phthalocyanine, 40 parts.

The chlorination was continued at the same temperature and rate for 228 minutes and the product worked up by drowning in water as usual. The yield was 75 parts equal to 1.87 parts per part of copper phthalocyanine used. When acid-pasted and compared to a commercial polychlorinated copper phthalocyanine green by rubbing up on the Hoover muller, it was slightly deep in masstone, slightly blue in tint and slightly blue in drawout.

Example 8

| | Parts |
|---|---|
| Phthalic anhydride | 315 |
| Molybdenum trioxide, pure grade | 9 |
| Powdered sulfur | 3 |

The above materials were charged to a glass chlorinator and, while stirring at 162° C., chlorine was passed through at the rate of 0.94 part per minute until the charge weighed 480 parts, requiring 388 minutes. Then was added: Acid-leached crude copper phthalocyanide, 40 parts.

Chlorination was then continued 228 minutes at the same rate while stirring at 162° C. The product was worked up by drowning in water and filtering and amounted to 75 parts equal to 1.88 parts per part of copper phthalocyanine. When acid-pasted and compared to a commercial polychlorinated copper phthalocyanine green by rubbing up on the Hoover muller, it was slightly deep in masstone, slightly blue and a trace clean in tint, and slightly blue in drawout.

Example 9

| | Parts |
|---|---|
| Dichlorophthalic anhydride recovered from a previous chlorination (contained 0.33% molybdenum) | 2535 |
| Phthalic anhydride, commercial | 843 |
| Powdered sulfur | 47 |
| Molybdenum trioxide, pure grade | 58 |

The above materials were charged to a glass-lined chlorinator and heated to 160° C., then 1290 parts of chlorine were passed through while agitating vigorously. The temperature of the charge varied between 145° C. and 180° C. during this operation. Hot water was used for cooling. At the end of this operation, the organic material in the chlorinator had been substantially converted to dichlorophthalic anhydride or to a mixture with approximately the same chlorine content as dichlorophthalic anhydride. During the first part of this operation, a chlorine flow rate of 6.0 parts per minute was used while the chlorinator was kept at atmospheric pressure. During the latter part of this operation, a chlorine flow rate of 4.0 parts per minute was used while the pressure was kept at 15 lbs. per square inch above atmospheric pressure.

Then was charged to the chlorinator: Acid-leached crude copper phthalocyanide, 314 parts.

While keeping the pressure in the chlorinator at 25 lbs. per square inch above atmospheric pressure 1354 lbs. of chlorine were passed through the agitated charge at the rate of 6.0 lbs. of chlorine per minute. During this chlorination, the temperature varied between 155° C. and 180° C.

In another vessel 3780 parts of water was heated to 60° C., and then the contents of the chlorinator were carefully drowned in it, the final temperature being close to 100° C. Some of the resulting slurry was used to wash out the chlorinator. After recombining, the slurry was filter-pressed and the cake washed thoroughly with hot water. The crude product was dried and, when acid-pasted and compared to a commercial polychlorinated copper phthalocyanine green by rubbing up on the Hoover muller, it was a trace deep in masstone, a trace blue and a trace weak in tint, and a trace strong in drawout. The yield was 589 parts of green which equals 1.88 parts per part of copper phthalocyanine used.

Example 10

To a glass reactor was charged 480 parts of the chlorinated phthalic anhydride produced in Example 1 by chlorinating phthalic anhydride and which contained 30.5% chlorine and 1.31% molybdenum. This dichlorophthalic anhydride was melted, and to it was added 40.0 parts of acid-leached crude copper phthalocyanine. Then, while stirring this mixture at 162° C., 484 parts of bromine was added beneath the surface over the course of 228 minutes. The mixture was then drowned in water and filtered to remove the product which was washed and dried and amounted to 95 parts analyzing 50.5% bromine. In shade, it was about half-away between copper phthalocyanine blue and a fully chlorinated copper phthalocyanine green.

Example 11

To a glass reactor was charged 480 parts of dichlorophthalic anhydride containing 1.32% molybdenum and produced by chlorinating phthalic anhydride in the presence of molybdenum trioxide and sulfur. It was melted, and to it was added 40.0 parts of acid-leached crude copper phthalocyanine. Then, while stirring this mixture at 162° C., 180 g. of bromine and 153 g. of chlorine were added simultaneously beneath the surface over the course of 226 minutes. The mixture was then drowned in water and filtered to remove the product which was washed and dried and amounted to 86.7 parts. This product when acid-pasted and compared to a commercial yellow-shade copper phthalocyanine green (that contained both chlorine and bromine) by rubbing up on the Hoover muller was slightly light in masstone, slightly blue and slightly strong in tint, and a trace blue in drawout. It was also substantially yellower in shade than ordinary polychlorinated copper phthalocyanine green.

Example 12

| | Parts |
|---|---|
| Dichlorophthalic anhydride recovered from a previous chlorination | 432 |
| Phthalic anhydride | 33 |
| Molybdenum pentachloride | 1.7 |
| Acide-leached crude copper phthalocyanine | 40 |

The dichlorophthalic anhydride was recovered from aqueous solution by reconcentrating until the temperature reached 162° C., then passing air through it to remove a small additional amount of water. It then contained approximately 1.2% of molybdenum. It was melted and placed in a glass chlorination vessel, followed by the other materials listed above. Then while stirring the mixture at 160° C., 20.3 parts of sulfur monochloride was added dropwise over the course of 20 minutes. Then while stirring the mixture at 162° C., chlorine was passed through at the rate of 0.94 part per minute for 288 minutes. The mixture was then drowned carefully with agitation in 480 parts of hot water, filtered, and the filter cake washed with three small portions of hot water. The yield of color was 77½ parts which equals 1.94 parts per part of copper phthalocyanine used. When acid-pasted and compared to a commerical polychlorinated copper phthalocyanine green by rubbing up on the Hoover muller, it was slightly deep in masstone, and slightly blue and a little dirty in tint and drawout.

Example 13

| | Parts |
|---|---|
| Commercial phthalic anhydride | 315.0 |
| Molybdenum trioxide, pure grade | 9.0 |
| Ground sulfur | 6.0 |
| Acid-leached crude copper phthalocyanine | 31.8 |

In a glass chlorination vessel, the phthalic anhydride was melted, then the other materials were added. This mixture was stirred vigorously at a temperature between 162 and 170° C., while passing chlorine through for 59 minutes at a rate of 0.31 part per minute and for 531 minutes at a rate of 0.94 part per minute. The mixture was then drowned carefully with agitation in 48 parts of hot water, filtered, and the filter cake washed thoroughly with hot water. The yield of color was 61.0 parts which equals 1.92 parts per part of copper phthalocyanine used. When acid-pasted and compared to a commercial polychlorinated copper phthalocyanine green by rubbing up on the Hoover muller, it was a little deep in masstone, a trace blue and very strong in tint, and a trace blue and slightly strong in drawout.

In accordance with the invention, the halogenation, e.g., chlorination, bromination, and so on, of phthalocyanine compounds, including both the metal-free and the metal-containing types, is carried out in a medium comprised of phthalic anhydride and/or halogenation derivatives of phthalic anhydride, e.g., dichlorophthalic anhydride, and a molybdenum-containing catalyst. When the halogenation is carried out in a medium which is at the start comprised of unhalogenated phthalic anhydride and a molybdenum catalyst, more halogen will be required to complete the halogenation of the phthalocyanine, since the phthalic anhydride itself will react with the halogen much more readily than a halogenation derivative of phthalic anhydride, such as dichlorophthalic anhydrides does. Consequently, while this system can be used, it is preferred to halogenate the phthalic anhydride first by itself.

The halogenation of the phthalic anhydride can be carried out at any suitable temperatures, although temperatures from about 140° C. to about 180° C. are preferred. Gaseous halogen, e.g., gaseous chlorine, is preferred, although a liquid halogen or any form or compound of halogen which will supply halogen under the conditions of the reaction can be used.

During halogenation, e.g., chlorination of the phthalic anhydride, the density of the molten phthalic anhydride at 162° C. increases from about 1.23 gm./ml. at the start at 0.0% chlorine content until it reaches about 1.50 gm./ml. at a chlorine content of about 33%. It is preferable not to carry the chlorination of the phthalic anhydride much beyond about 33–35% since this would lead to an increase in the melting point which in turn would necessitate a higher reaction temperature. However, if higher reaction temperatures are not objectionable, chlorination can be continued to a chlorine content of about 49%. There is no minimum degree of chlorination of the phthalic anhydride, of course, since, as indicated above, the unchlorinated phthalic anhydride can be used. However, where chlorination is used, it is preferred, for reasons previously stated, to chlorinate at least to a chlorine content of about 30%.

The phthalic anhydride or chlorinated phthalic anhydride should not contain any water since that will tend to deactivate the molybdeum catalyst. The molybdenum catalyst may be provided in several forms. For example, it may be provided in the form of powdered molybdenum metal. In that case, there will be a short period at the start during which the molybdenum is reacting with the chlorine and during which little chlorination of the phthalic anhydride itself will take place. The catalyst produced works quite well, although there may be a tendency for some unreacted molybdenum power to remain. Molybdenum pentachloride, which is commercially available, also works very well and, in this case, there is no induction period at the start during which chlorination of the phthalic anhydride is delayed.

A very inexpensive and very satisfactory way of introducing the molybdenum catalyst is described in Example 2. This shows that the same amount of catalyst can be introduced at less cost by using molybdenum trioxide and sulfur in place of molybdenum pentachloride. Moreover, the sulfur in combination with the chloride serves to remove any traces of moisture which might be present. This method is particularly useful when the solvent medium is recovered for re-use from aqueous solution, in which case a substantial portion of the molybdenum is recovered with it, but in the form of an oxide or other compound catalytically inactive.

The amount of sulfur to be used is not critical and can vary within wide limits. For instance, in Example 2, 1.33 parts of sulfur per part of molybdenum trioxide was used, and in Example 8, 0.33 part, both examples performing satisfactorily. In the latter example, however, the product was slightly bluer than in the former, indicating that this was near the lower limit of the amount of sulfur which should be used. In general, the amount of sulfur can vary from about 0.30 part to about 2.0 parts per part of molybdenum calculated as molybdenum trioxide. It is preferred to use from about 0.50 to about 0.75 part of sulfur per part of molybdenum present calculated as molybdenum trioxide. If too little sulfur is used, the catalyst will not be properly activated but, on the other hand, if too much is used, the excess sulfur will not be readily eliminated from the solvent medium. This is important because, if all of the excess sulfur is not eliminated before introduction of the phthalocyanine, the latter may be damaged as to cleanliness. The excess sulfur distills from the medium in the form of a compound which may be readily condensed to a reddish-brown liquid consisting probably of sulfur monochloride or dichloride. In practice, this material may be disposed of in any suitable fashion. As a substitute for sulfur, other sulfur compounds such as sulfur monochloride may be used with satisfactory results. However, sulfur is preferred since it is cheaper and easier to handle.

The amount of molybdenum catalyst may also vary rather widely. As the examples show, satisfactory results are obtained when the amount of molybdenum is varied from as little as 0.67% by weight calculated on the basis of the solvent medium (Example 7) to as high as 2.50% (Example 6). In the former case, the product came out slightly bluer than usual, and in the latter case, it was possible to operate at a much lower temperature. It may thus be seen that the amount of molybdenum catalyst is not very critical. In general, the amount of molybdenum based on the solvent medium can vary from about 0.4% to about 5%. It is preferred to use from about 1.00% to about 1.50% molybdenum calculated on the basis of the chlorinated anhydride solvent medium, as it is immediately prior to introduction of the phthalocyanine.

The phthalocyanine should be introduced into the reaction medium in a dry state to avoid deactivating the catalyst. It is not necessary for it to be in a fine state of division, though it preferably should be free of lumps which will not break up during the course of the reaction. For ease of operation, it is preferred to use hammer-milled material. The phthalocyanine should be reasonably pure, although it is not necessary for it to be acid-pasted. It is preferred to use a grade which has been leached with dilute sulfuric acid. The amount of phthalocyanine in relation to the reaction medium can vary rather widely, the sole limitation being the viscosity of the mixture and the difficulty of handling, which increases as the amount of phthalocyanine is increased. It is preferred to use from about 0.04 part to about 0.12 part of phthalocyanine per part of chlorinated phthalic anhydride.

The temperature of the halogenation of the phthalocyanine may also vary rather widely. When chlorinating, the lower limit is set by the temperature at which solidification of the solvent medium begins which is usually about 100° C. If a low chlorination temperature is used, then it is desirable to increase the amount of catalyst, as exemplified in Example 6. The upper limit of temperature is set by the tendency for the solvent medium to react more rapidly with the halogen as the temperature is increased and by the tendency of the solvent medium to evaporate. While temperatures from about 80° C. to about 260° C. can be used, for both halogenation of the phthalic anhydride and tof the phthalocyanine, the preferred temperature range is from about 150° C. to about 170° C.

Although the use of an elevated pressure is not necessary and the halogenation works perfectly well at atmospheric pressure, an elevated pressure can be used, if desired. It has been found that, where the chlorination of copper phthalocyanine is concerned, an efficiency of chlorine utilization amounting to about 35% can be attained at atmospheric pressure (for instance, Example 1), whereas a slightly higher efficiency can be attained by increasing the pressure (see Example 9 where at 25 p.s.i.g. the chlorine efficiency was 43%). These statements are made with the assumption that the chlorination is continued until the copper phthalocyanine is, for practical purposes, completely chlorinated, e.g., until it contains 48–49% chlorine, and that the chlorination is carried forward at a practical rate. However, it is to be noted that the use of an elevated pressure is in no wise necessary for these latter two conditions to be met.

As to the halogen rate itself, this can also vary rather widely, the sole requirement being that the halogen not be introduced so rapidly as to expel the contents from the reactor. Also, it is true, as might be expected, that there is a tendency for the efficiency of the halogen utilization to increase as the rate is slowed down. When chlorinating, it is preferred to introduce the chlorine at the rate of about 0.019 to 0.025 part per part of copper phthalocyanine per minute, as exemplified in most of the examples. Under these conditions, it has been found that the chlorination is completely finished to the point where the copper phthalocyanine contains 48–49% chlorine in about 225–228 minutes.

When the halogenation of the phthalocyanine is complete, the reaction mixture can be drowned in water. The amount of water should be not more than an amount about equal to the weight of dichlorophthalic anhydride present at the start of the halogenation. For instance, in the examples where 40.0 parts of copper phthalocyanine was used, 480 parts of the solvent medium was also used, followed by drowning at the end in 480 parts of water. Less water can be used, e.g., 100 parts, but the amount should not be increased very much in view of the possibility of precipitating impurities which may wind up in the product with deleterious results. The water can be at any temperature up to about 90° C. at the start. Since heat is given off by the hydrolysis of the anhydride, it is preferable to have the anhydride hydrolyze as soon as possible after entering the water in order to avoid a sudden evolution of heat. To this end, it is better to carry the drowning out so the final temperature is about 90° C. However, this is not essential. The drowning can be carried out cold with subsequent heating. After the drowning is complete, the mixture is stirred about 30 minutes at any temperature from about 80° C. to the boil in order to insure solution of all the soluble materials, preferably 90° C. to 95° C. The slurry is then filtered in any suitable manner and the cake washed with an amount of hot water equal to about ⅔ of the amount originally used in the drowning. This is combined with the filtrate for recovery. The filter cake is then washed with further amounts of hot water until substantially acid free, discarding this wash water. The cake is then ready to be dried and pigmented in any desired way.

The filtrate from the above operation contains the bulk of the chlorinated phthalic anhydride. During reconcentration by evaporation of the water, this material will remain liquid all the way up to a temperature of 162° C., provided no excessive amount of high-melting materials is present. As shown in Example 4, these tend to accumulate to some extent in the chlorinated phthalic anhydride over the course of several chlorinations, due to continued reaction of the chlorinated anhydride with the chlorine. It is not necessary to remove all of these high-melting materials after every chlorination. However, if they are not removed at least partially at some point, they are apt to cause an excessive thickening of the reaction medium during chlorination or to be difficult to remove from the green product due to their poor solubility. Therefore, they should be removed, at least in part, at suitable intervals to avoid the above difficulties. This is best carried out by reconcentrating the filtrate, then cooling and stirring until the temperature falls to about 18° C. to 25° C., and finally filtering to remove the crystallized material.

Although it is preferable, it is not absolutely essential to drown the finished halogenation in water. Instead, it can be filtered in the molten state using any suitable type of filtering apparatus. A series of seven consecutive chlorinations has been carried out in the laboratory using this procedure and using the same batch of chlorinated phthalic anhydride over and over again without ever drowning it in water. The recovery of the solvent medium averaged about 75% after each chlorination. Another alternative is to drown the finished halogenation in carbon tetrachloride or some other solvent which does not react with either the anhydride or the catalyst. In this case, the solvent medium can be recovered in very large degree simply by evaporating the solvent after filtering off the product. However, drowning the halogenation in water is much preferred because, on the one hand, the filtration is much easier than when either of the other two methods is used, and, on the other hand, it also provides a simple way of removing the high-melting materials which develop in the solvent medium.

For introduction of the molybdenum catalyst into the anhydrous phthalic anhydride or halogenated anhydride, other halides of molybdenum, e.g., a bromide or iodide of molybdenum, could be used in place of the chloride. As a matter of fact, any compound of molybdenum capable of becoming catalytically active in this system in the presence of halogen, or halogen and sulfur together, is suitable.

As a substitute for the sulfur utilized in the preparation of the reaction medium, we can use halides of sulfur, hydrogen sulfide, or any compound of sulfur capable of liberating sulfur chloride under the conditions of the reaction. In fact, any material which is capable of promoting the molybdenum to a catalytically active state would be suitable.

It will thus be seen that the present invention provides an improved method for the halogenation of phthalocyanines as well as a novel reaction medium for carrying out such a method.

What I claim and desire to protect by Letters Patent is:

1. The method of chlorinating a phthalocyanine which comprises suspending the same in a reaction medium formed by chlorinating a mixture of phthalic anhydride, molybdenum trioxide and sulfur, the amount of molybdenum varying from about 0.4% to about 5% by weight, based on the weight of reaction medium, and the amount of sulfur varying from about 0.30 part to about 2.0 parts per part of molybdenum calculated as molybdenum trioxide, and subjecting the suspension to a chlorinating agent at a temperature from about 80° C. to about 260° C. until the desired degree of chlorination is obtained.

2. The method of claim 1 wherein after the desired degree of chlorination is reached, the reaction mixture is drowned in water, filtered, and the filtrate concentrated by evaporation of the water to recover a reaction medium which can be re-used in the process.

3. The method of claim 2 wherein the recovered reaction medium is mixed with additional molybdenum trioxide, sulfur and phthalic anhydride and the mixture chlorinated to a chlorine content from about 30% to about 35%.

References Cited by the Examiner

UNITED STATES PATENTS

| | | | |
|---|---|---|---|
| 2,195,984 | 4/1940 | Dent et al. | 260—314.5 |
| 2,214,469 | 9/1940 | Linstead et al. | 260—314.5 |
| 2,574,512 | 11/1951 | Toland | 260—346.4 |
| 2,862,929 | 12/1958 | Caliezi et al. | 260—314.5 |
| 2,873,279 | 2/1959 | Randall et al. | 260—314.5 |
| 2,929,792 | 3/1960 | Arnold et al. | 252—430 |
| 2,964,559 | 12/1960 | Burney et al. | 260—346.7 |
| 3,025,245 | 3/1962 | Brindell et al. | 252—429 |

OTHER REFERENCES

Berkman et al.: Catalysts, Reinhold Pub. Co., New York (1940), page 590.

Mellor: Comprehensive Treatise on Inorganic Theoretical Chem., Longmans, Green and Co., New York, vol. 11 (1931), page 624.

IRVING MARCUS, *Primary Examiner.*

JOHN D. RANDOLPH, WALTER A. MODANCE,
*Examiners.*